(12) United States Patent
Ege et al.

(10) Patent No.: US 9,249,839 B2
(45) Date of Patent: Feb. 2, 2016

(54) SHIFTING DEVICE OF A MOTOR VEHICLE TRANSMISSION

(71) Applicant: ZF Friedrichshafen AG, Friedrichshafen (DE)

(72) Inventors: Georg Ege, Kressbronn (DE); Rainer Novak, Bregenz (AT)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/194,905

(22) Filed: Mar. 3, 2014

(65) Prior Publication Data
US 2014/0284166 A1 Sep. 25, 2014

(30) Foreign Application Priority Data

Mar. 19, 2013 (DE) .......................... 10 2013 204 787

(51) Int. Cl.
*F16D 15/00* (2006.01)
*F16D 21/04* (2006.01)
*F16H 3/083* (2006.01)

(52) U.S. Cl.
CPC ............. *F16D 15/00* (2013.01); *F16D 21/04* (2013.01); *F16H 3/083* (2013.01); *F16D 2300/24* (2013.01)

(58) Field of Classification Search
CPC ..... F16D 15/00; F16D 21/04; F16D 2300/24; F16D 3/083
See application file for complete search history.

(56) References Cited

U.S. PATENT DOCUMENTS

| 2,861,461 | A | * | 11/1958 | Otto | 74/371 |
| 4,141,424 | A | * | 2/1979 | Murayama et al. | 180/53.2 |
| 4,789,274 | A | * | 12/1988 | Shoji et al. | 408/11 |
| 5,445,044 | A | * | 8/1995 | Lee | 74/372 |

FOREIGN PATENT DOCUMENTS

| DE | 937 990 C | 1/1956 |
| DE | 1 049 714 | 1/1959 |
| DE | 1 186 353 B | 1/1965 |
| GB | 20 127 | 10/1907 |

OTHER PUBLICATIONS

German Search Report Corresponding to 10 2013 204 787.8 mailed Oct. 30, 2013.

* cited by examiner

*Primary Examiner* — Robert Hodge
*Assistant Examiner* — Terry Chau
(74) *Attorney, Agent, or Firm* — Davis & Bujold, P.L.L.C.; Michael J. Bujold

(57) ABSTRACT

A shifting device of a motor vehicle transmission having a driveshaft (2) in the form of a hollow shaft with radial bores (5, 6, 7, 8). At least one drive output element (3) is arranged on the driveshaft (2), a shifting element (4) is arranged to move axially within the hollow shaft (2), and coupling elements, in the form of balls (9, 10, 11, 12), move radially within the radial bores (5, 6, 7, 8; 24). The drive output element (3) can be coupled to and decoupled from the driveshaft (2) by axial displacement of the shifting element (4) and radial displacement of the balls (9, 10, 11, 12). The shifting element is in the form of a shifting piston (4) and the hollow shaft (2) is in the form of a shifting cylinder (2aa).

3 Claims, 3 Drawing Sheets

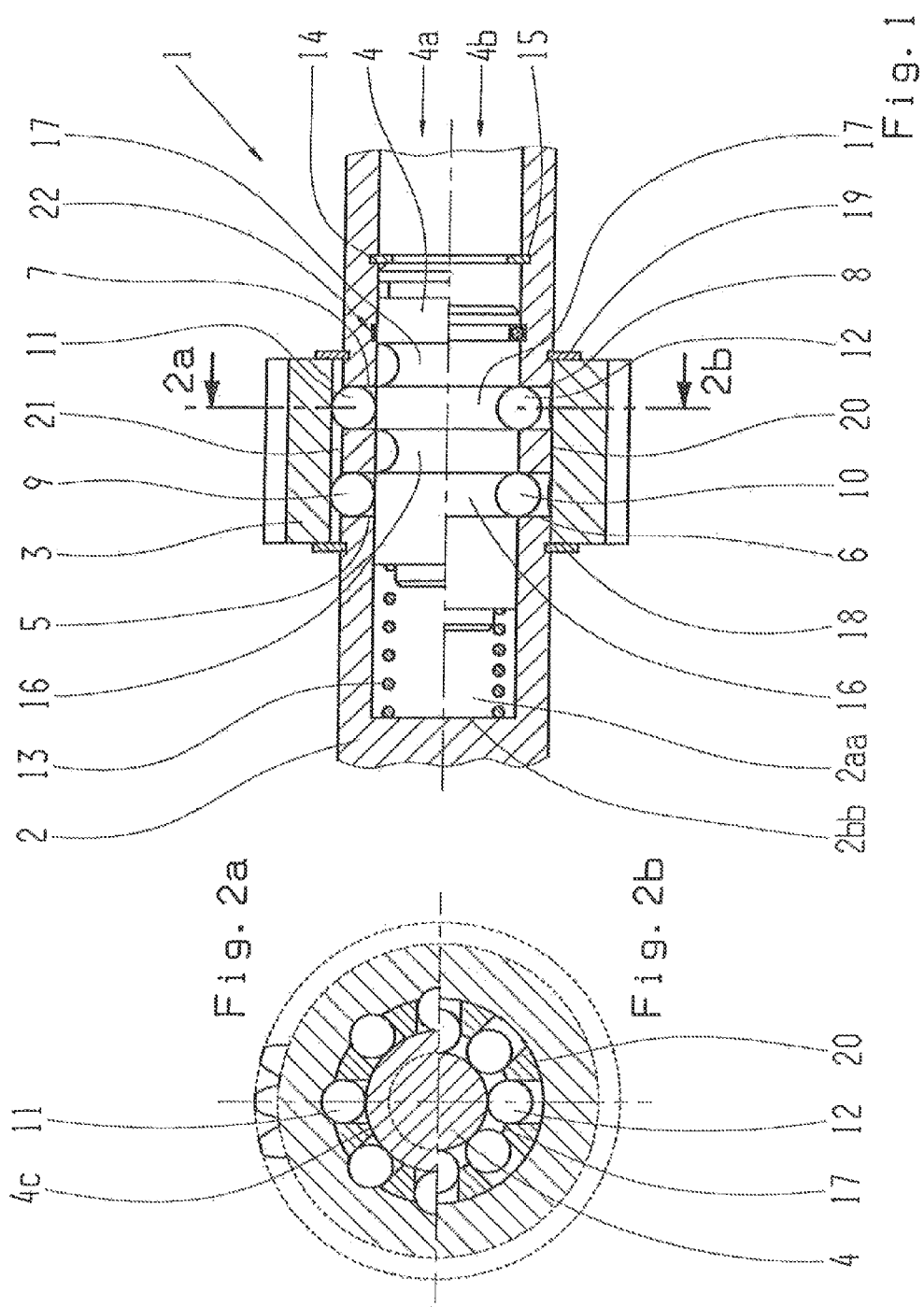

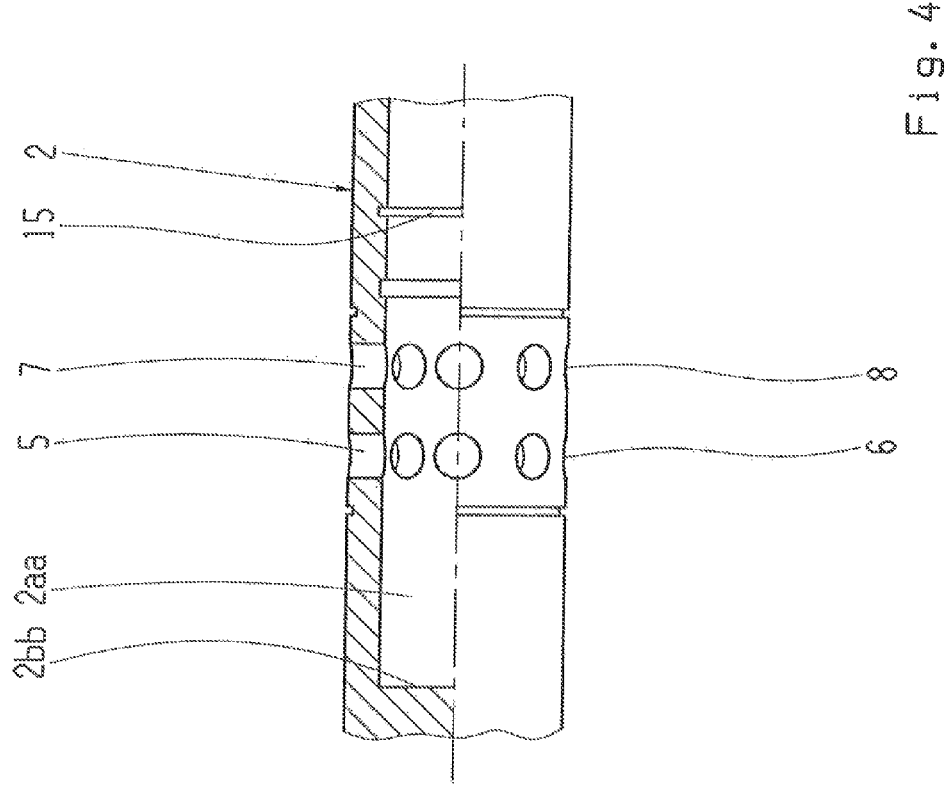
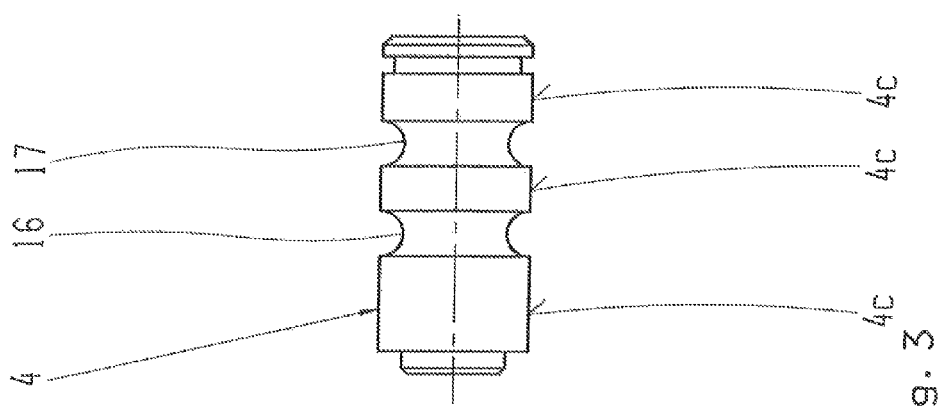

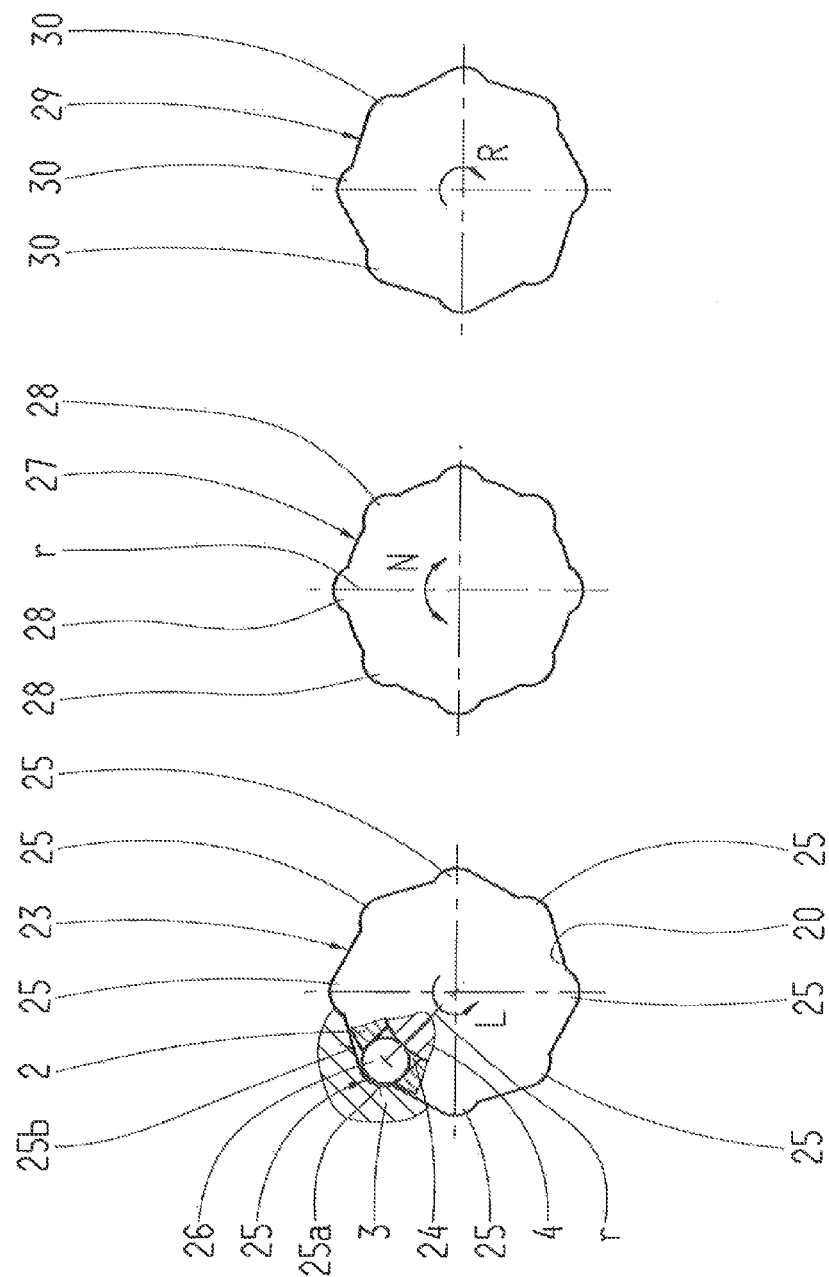

SHIFTING DEVICE OF A MOTOR VEHICLE TRANSMISSION

This application claims priority from German patent application serial no. 10 2013 204 787.8 filed Mar. 19, 2013.

FIELD OF THE INVENTION

The invention concerns a shifting device of a motor vehicle transmission known from DE 937 990.

BACKGROUND OF THE INVENTION

From DE 937 990 a shifting device for a motor vehicle transmission is known, in which the individual gears are engaged by means of a so-termed draw key. A main transmission shaft in the form of a hollow shaft, on which gearwheels are arranged, holds the axially displaceable draw key inside it. In the area of the gearwheels the hollow shaft has radial bores in which shifting balls are held and can move radially, which for coupling are pushed apart by the draw key. This produces a rotationally fixed connection between the gearwheel concerned and the main transmission shaft.

As is known, in present-day motor vehicle transmissions including automatic transmissions claw clutches are used for engaging individual gears. Claw clutches have the advantage that their structure is relatively compact, so they can transmit relatively large torques. A disadvantage of claw clutches is that they can only be engaged when the speed difference is virtually zero and it is always possible for a so-termed tooth-on-tooth position to occur, in which the clutch cannot be engaged at all. So far, it has not been possible to solve the problem satisfactorily.

SUMMARY OF THE INVENTION

The purpose of the present invention is to propose a suitable clutch which, on the one hand, enables relatively large torques to be transmitted, and on the other hand avoids a tooth-on-tooth position.

Starting from the known shifting device, a first aspect of the invention provides that the shifting element is in the form of a shifting piston and the hollow shaft is in the form of a shifting cylinder. This had the advantage that the drive output elements arranged on the hollow shaft, which are preferably gearwheels, can be engaged by axial displacement of the shifting piston. Preferably, the shifting piston is acted upon by a hydraulic or pneumatic pressure medium. This gives a compact shifting device which renders synchronization superfluous. The clutch according to the invention can be engaged with low load and within a small speed difference window—so that to initiate the engagement process it is not necessary for the drive input and the drive output elements to have the same rotational speed.

In a preferred embodiment, in the area of the at least one drive output element are arranged at least one row of radial bores, with which are associated annular grooves formed on the shifting piston. When the annular grooves are aligned with the radial bores in the radial direction, then by virtue of the internal contour of the drive output element the balls are pushed inward into the annular grooves so that the drive output element or gearwheel is decoupled. In the opposite case, i.e. when the annular grooves are not aligned with the radial bores but instead with the circumferential surface of the shifting piston this blocks off the radial bores on the inside, the balls are pushed outward and the drive output element or gearwheel is connected to the driveshaft in a rotationally fixed manner, i.e. it is coupled thereto.

In a further preferred embodiment the drive output element has a bore with a bore wall in which are formed pocket-shaped recesses that correspond in number and distribution to the radial bores. The pocket-shaped recesses partially hold the balls in the coupled condition, so that there is a shape interlock between the drive input element and the drive output element.

In another preferred embodiment the pocket-shaped recesses are in the form of elongated grooves with an asymmetrical corresponding profile, the profile having a rounded portion shaped to fit the balls and a flat, inclined portion extending outward. This enables a gentle coupling action. The asymmetrical cross-section profile is dependent on the rotational direction, i.e. it is designed for either clockwise or counterclockwise movement.

In a further preferred embodiment the pocket-shaped recesses are in the form of elongated grooves with a radially symmetrical cross-section profile, the profile matching the shape of the balls and being independent of the rotational direction.

In a further preferred embodiment the shifting piston can be actuated by hydraulic, pneumatic or mechanical means. Thus, the actuating system can be chosen to suit the circumstances.

In another preferred embodiment the at least one drive output element is in the form of a gearwheel. The gearwheel can be arranged on the driveshaft as a loose wheel of a gear of the transmission and coupled to the driveshaft as necessary. A plurality of gearwheels can be arranged next to one another on the driveshaft, and in such a case the shifting piston must be made corresponding longer.

According to a further aspect of the invention, the shifting device according to the invention can be used particularly advantageously in an automatic transmission. This has the advantage that the interlocked coupling according to the invention can replace a claw clutch having the above-mentioned disadvantages. This offers advantages in relation to shifting comfort—a wider speed difference window—and to the fitting space required.

BRIEF DESCRIPTION OF THE DRAWINGS

An example embodiment of the invention is illustrated in the drawings and will be described in more detail below, so that further features and/or advantages may emerge from the description and/or the drawings, which show:

FIG. 1: An axial section through the shifting device according to the invention, FIG. 2a: A radial half-section with the drive output element coupled, FIG. 2b: A radial half-section with the drive output element decoupled, FIG. 3: A shifting piston of the shifting device according to the invention, FIG. 4: A hollow shaft of the shifting device which forms a shifting cylinder, FIG. 5: A first internal contour with pocket-shaped recesses in the drive output element, FIG. 6: A second internal contour with pocket-shaped recesses, and FIG. 7: A third internal contour with pocket-shaped recesses.

DETAILED DESCRIPTION OF THE PREFERRED EMBODIMENTS

FIG. 1 shows a shifting device 1 according to the invention, which comprises a driveshaft in the form of a hollow shaft 2 and a drive output element 3 in the form of a gearwheel 3. The hollow shaft 2 is designed as a shifting cylinder 2aa and has a shifting piston 4 therein. In the wall of the hollow shaft 2 are formed radial bores 5, 6 in a first row and radial bores 7, 8 in a second row, which in each case hold coupling elements in the form of balls 9, 10, 11, 12 which can move radially inside the bores. The hollow shaft 2 has an end wall 2bb against which a compression spring 13 for restoring the shifting piston 4 is supported. On the other side, the movement path of the shifting piston 4 is limited by a retaining ring 14 inset into a groove 15 in the hollow shaft 2. The shifting piston 4 is shown in two positions, namely in the upper half 4a in a locking position and in the lower half 4b in the release condition. The shifting piston 4 has two circumferential grooves 16, 17 whose groove cross-section is shaped to fit the balls 9 to 12. The gearwheel 3 is axially fixed on the driveshaft 2 by axial retaining elements 18, 19 and has a bore 20 in which, distributed around the circumference, pocket-shaped recesses 21 in the form of longitudinal grooves are formed. The recesses serve to hold the balls 9, 11 in the locked, i.e. coupled condition. A detent element 22 is provided for fixing a shift position.

FIGS. 2a and 2b show respective half radial sections along the section plane 2a-2b in FIG. 1. Thus. FIG. 2a shows the upper half in the shifting piston 4a in FIG. 1. The ball 11 is held on one side with interlock in the longitudinal groove 21 of the gearwheel 3 and is supported radially on the inside on the circumference 4c of the shifting piston 4. Thus, in this position the gearwheel 3 is connected in a rotationally fixed manner to the driveshaft 2. FIG. 2b shows the lower half in the shift position 4b (FIG. 1): in this case the ball 12 is pressed by the circumference of the bore 20 into the groove 17. Accordingly, the gearwheel 3 is decoupled. The representations shown in FIGS. 2a and 2b are schematic, i.e. incomplete; for example, the radial bores 7, 8 are not shown, whereas FIG. 4 shows them more exactly.

FIG. 3 shows the shifting piston 4 as an individual component, with a cylindrical circumference 4c in which two circumferential grooves 16, 17 are formed, whose radius matches the radius of the balls (FIG. 1).

FIG. 4 shows the hollow shaft 2, which is designed as a shifting cylinder 2aa with a cylinder bottom 2bb, as an individual component. In the wall of the hollow shaft 2 are bores 5, 6, 7, 8 distributed around the circumference, which are arranged in two axially offset rows. The bores 5 to 8 match the diameter of the balls 9 to 12, so that the balls can move in the radial direction.

FIG. 5 shows an internal contour 23 of the gearwheel 3 (see FIG. 1) and a partial section in the area of a radial bore 24 through the driveshaft 2, the shifting piston 4 and the gearwheel 3. In the circumferential surface of the bore 20 of the gearwheel 3 are formed a plurality of pocket-shaped recesses 25, namely eight of them in the example embodiment illustrated, which have asymmetrical cross-sections relative to a radial direction r. The pocket-shaped recesses 25 are in the form of longitudinal grooves and correspond to the longitudinal groove 21 in FIG. 1. The cross-section contour of the recesses 25, also called the cross-section profile, consists of a curve 25a covering approximately a quarter of a circle and a flat, outward-inclined surface or ramp 25b. This cross-section profile 25a, 25b is designed for a driveshaft 2 rotating mainly counterclockwise as indicated by the rotation arrow L. This results in a "smooth" entrainment of the gearwheel 3 after coupling. The ball 26 shown in the partial section is partially within the radial bore 24 and partially within the pocket-shaped recess 25, so that there is positive locking between the driveshaft 2 and the drive output element 3. Thus, the ball 26 or the balls 9 to 12 in FIG. 1 are not clamping bodies (as in the case of a freewheel), but rather, coupling elements for positive locking. The forces occurring in this case in the circumferential direction are substantially smaller than with clamping bodies. The shifting device can be adapted for the torque to be transmitted by varying the number of balls around the circumference and in the axial direction.

FIG. 6 shows another internal contour 27 of the drive output element, such that around the circumference are arranged pocket-shaped recesses 28 whose radial cross-section, this time, is radially symmetrical. Relative to a radial direction r the cross-section of the recesses 28 is symmetrical, having approximately the contour of a semicircle which fits the ball diameter. The internal contour 27 is suitable for clockwise or counterclockwise rotation of the drive output element, as indicated by a double rotation arrow N.

FIG. 7 shows an internal contour 29 as a counterpart to the internal contour 23 according to FIG. 5, for clockwise rotation as indicated by rotation arrow R. Distributed around its circumference, the internal contour 29 has pocket-shaped recesses 30 with an asymmetrical cross-section profile, analogous to the profile of the recesses 25 in FIG. 5. This geometry results in relatively gentle coupling between the drive input and drive output elements, which is possible for rotational speed differences within a relatively narrow range.

The shifting device 1 according to the invention works as follows: When the gearwheel 3 is coupled as in position 4a (FIG. 1), the shifting piston 4 is pushed against the axial securing ring 14 by the compression spring 13 and fixed in that position. In position 4a the shifting piston 4 is not acted upon by pressure. When the gearwheel 3 has to be decoupled, i.e. moved to position 4b, the end face of the shifting piston 4 is acted upon by hydraulic or pneumatic pressure and—in the drawing—the shifting piston moves to the left until it reaches the detent element 22 and the shifting piston 4 is fixed in position 4b. The balls 9 to 12 or 26 are then pushed by the internal contour (see FIG. 5) of the gearwheel 3 radially inward into the radial grooves 16, 17. This releases the positive interlock and the gearwheel 3 is decoupled.

INDEXES

1 Shifting device
2 Driveshaft
2aa Shifting cylinder
2bb End wall
3 Drive output element 9 gearwheel
4 Shifting piston
4a Shift position, locked
4b Shift position, released
4c Circumference
5 Radial bore
6 Radial bore
7 Radial bore
8 Radial bore
9 Ball
10 Ball
11 Ball
12 Ball
13 Compression spring
14 Retaining ring
15 Groove
16 Circumferential groove
17 Circumferential groove
18 Retaining element
19 Retaining element
20 Bore of the gearwheel 21 Longitudinal groove
22 Detent element
23 Internal contour
24 Radial bore
25 Recess/longitudinal groove
25a Rounded portion
25b Inclined surface
26 Ball
27 Internal contour
28 Recess
29 Internal contour
30 Recess
L Arrow, counterclockwise rotation
N Double arrow, neutral
R Arrow, clockwise rotation
r Radial direction

The invention claimed is:

1. A shifting device of a motor vehicle transmission, the shifting device comprising:
- a hollow drive shaft (2) having two sets of radial bores (5, 6, 7, 8; 24), radial bores of each of the two sets of radial bores are arranged about a circumference of the drive shaft in a row, and the rows of the radial bores are axially offset from each other;
- a drive output gear (3) being supported on an exterior surface of the drive shaft such that the drive output gear is rotatable and axially fixed in relation to the drive shaft, and an inner surface of the drive output gear having a plurality of axially extending grooves;
- a shifting piston being supported by an interior surface of the drive shaft such that the shifting piston is axially slidable within the drive shaft between a locked position and an unlocked position, and the shifting piston comprising an outer surface having two circumferential grooves that are axially offset from each other, an axial width of the offset, between the rows of the radial bores, is substantially equal to an axial width of the offset between the circumferential grooves of the shifting piston;
- a plurality of balls being arranged within the two sets of radial bores in the drive shaft such that each of the radial bores receives a respective ball, and the plurality of balls being radially movable within the radial bores, and a diameter of the balls is substantially equal to an axial width of each of the circumferential grooves of the shifting piston;
- when the shifting piston is in the locked position, the plurality of balls within each of the sets of radial bores contact the outer surface of the shifting piston on opposite axial sides of one of the two circumferential grooves, protrude beyond the exterior surface of the drive shaft and are received within the axially extending grooves of the inner surface of the drive output gear so as to rotationally fix the drive output gear to the drive shaft; and
- when the shifting piston is in the unlocked position, the plurality of balls are received within the two circumferential grooves on the outer surface of the shifting piston and the plurality of balls are completely received within the exterior surface of the drive shaft such that the drive output gear is rotatable with respect to the drive shaft.

2. The shifting device according to claim 1, wherein the shifting piston is biased to the locked position by a spring.

3. The shifting device according to claim 2, wherein the spring is arranged within the drive shaft such that one end of the spring abuts an axial end wall of the drive shaft and an opposed end of the spring abuts an axial face of the shifting piston to bias the shifting piston to the locked position.

* * * * *